(12) United States Patent
Ding (10) Patent No.: US 12,153,092 B2
(45) Date of Patent: Nov. 26, 2024

(54) SYSTEM AND METHOD FOR PREDICTING COMPATIBILITY OF A NEW UNIT FOR AN EXISTING SYSTEM

(71) Applicant: Rohde & Schwarz GmbH & Co. KG, Munich (DE)

(72) Inventor: Chow Han Ding, Singapore (SG)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1436 days.

(21) Appl. No.: 15/904,061

(22) Filed: Feb. 23, 2018

(65) Prior Publication Data

US 2019/0265298 A1 Aug. 29, 2019

(51) Int. Cl.
| | |
|---|---|
| *G01R 31/3183* | (2006.01) |
| *G06F 11/34* | (2006.01) |
| *G06F 11/36* | (2006.01) |
| *G06F 21/10* | (2013.01) |
| *G06F 30/33* | (2020.01) |

(Continued)

(52) U.S. Cl.
CPC .. *G01R 31/318357* (2013.01); *G06F 11/3457* (2013.01); *G06F 11/3672* (2013.01); *G06F 21/10* (2013.01); *G06F 30/33* (2020.01); *G06F 30/3308* (2020.01); *G06Q 30/0623* (2013.01); *G06Q 30/0627* (2013.01); *G06T 19/006* (2013.01); *H04L 9/3247* (2013.01)

(58) Field of Classification Search
CPC . G06F 8/60; G06F 8/65; G06F 11/368; G06F 11/3672; G06F 15/173; G06F 17/30; G06F 30/20; G06F 30/30; G06F 30/33; G06F 30/3308; G06F 30/347; G06F 2111/18; G06F 2111/20; G06F 2221/03; G06F 2221/034; G06Q 10/06; G06Q 30/02; G06Q 30/0621–0631; G16Y 10/75; G16Y 10/80; G16Y 20/20; G16Y 30/00; G16Y 40/10; G16Y 40/20; G16Y 40/30; G16Y 40/35; G16Y 40/40; G16Y 40/50

USPC .......................................................... 703/22
See application file for complete search history.

(56) References Cited

U.S. PATENT DOCUMENTS 8,713,560 B2 * 4/2014 Neumann ............. G06Q 30/06
717/174
9,058,190 B2 * 6/2015 Kline ...................... G06F 9/445
(Continued)

FOREIGN PATENT DOCUMENTS

WO WO-2017019006 A1 * 2/2017

*Primary Examiner* — Brian S Cook
(74) *Attorney, Agent, or Firm* — CHRISTENSEN O'CONNOR JOHNSON KINDNESS PLLC (57) ABSTRACT

A prediction system predicts compatibility of an existing test and measurement setup with a potential extension unit based on digital signatures. The prediction system includes a receiving unit, a processing unit, and a display unit. The receiving unit is configured to receive a digital signature from the potential extension unit and to forward the digital signature to the processing unit. The processing unit is configured to process the digital signature in order to predict whether the existing test and measurement setup is compatible with the potential extension unit. The processing unit is further configured to forward the result of the prediction to the display unit so that the result of the prediction is displayed. In addition, a method for predicting compatibility of an existing test and measurement setup with a potential extension unit based on digital signatures is described.

19 Claims, 3 Drawing Sheets

(51) Int. Cl.
*G06F 30/3308* (2020.01)
*G06Q 30/0601* (2023.01)
*G06T 19/00* (2011.01)
*H04L 9/32* (2006.01)

(56) References Cited

U.S. PATENT DOCUMENTS

| | | | | |
|---|---|---|---|---|
| 9,331,856 | B1* | 5/2016 | Song | G06F 21/36 |
| 10,332,187 | B2* | 6/2019 | Abuelsaad | H04L 67/125 |
| 10,810,644 | B2* | 10/2020 | Cenciarelli | G06Q 30/0613 |
| 2002/0112052 | A1* | 8/2002 | Brittingham | G06F 9/44505 |
| | | | | 709/224 |
| 2008/0228503 | A1* | 9/2008 | Buchheit | G06Q 30/0603 |
| | | | | 235/375 |
| 2011/0302201 | A1* | 12/2011 | Ogaz | G06Q 30/0631 |
| | | | | 707/769 |
| 2011/0303741 | A1* | 12/2011 | Bolton | G06Q 10/087 |
| | | | | 235/375 |
| 2014/0179236 | A1* | 6/2014 | Prakash | H04L 67/125 |
| | | | | 455/66.1 |
| 2015/0181432 | A1* | 6/2015 | Casu | H04W 12/50 |
| | | | | 726/4 |
| 2016/0078247 | A1* | 3/2016 | Tucker | G06F 21/602 |
| | | | | 726/1 |
| 2017/0173262 | A1* | 6/2017 | Veltz | G16H 20/17 |
| 2017/0265124 | A1* | 9/2017 | Seemann | G06N 5/04 |
| 2018/0124438 | A1* | 5/2018 | Barnett | H04N 21/4826 |

\* cited by examiner

SYSTEM AND METHOD FOR PREDICTING COMPATIBILITY OF A NEW UNIT FOR AN EXISTING SYSTEM

FIELD OF THE DISCLOSURE

Embodiments of the present disclosure relate to a prediction system for predicting compatibility of an existing test and measurement setup with a potential extension unit.

Further, embodiments of the present disclosure also relate to a method for predicting compatibility of an existing test and measurement setup with a potential extension unit.

BACKGROUND

Complex test and measurement setups typically comprise several functional units that may be used for different test and measurement purposes. The different functional units may be coupled with a common unit of the respective test and measurement setup so that certain components may be shared among the several functional units. Accordingly, a complex test and measurement setup can be extended by a new functional unit, also called instrument, or a new software license for an existing functional unit so that the test and measurement capacities of the overall test and measurement setup are increased. Alternatively or additionally, existing functional units may be replaced by newer ones. Generally, the physical functional unit and the software license both can be labelled as an extension unit as they extend the physical or rather the non-physical (software) capacities of the overall test and measurement setup. However, it has to be verified whether a certain functional unit is compatible to the existing test and measurement setup, in particular its common unit or the other functional units already present. Usually, this information is provided in respective data sheets of the units.

However, the data sheets of the typically used units are quite complex so that it is complicated and time-consuming to identify whether the existing test and measurement setup and the potential additional functional unit are compatible with each other so that the existing test and measurement setup can be extended in the desired manner.

SUMMARY

Thus, there is a need for a simple opportunity to identify whether an existing test and measurement system can be extended with a desired extension unit.

Embodiments of the present disclosure provide a prediction system for predicting compatibility of an existing test and measurement setup with a potential extension unit based on digital signatures, the prediction system comprising a receiving unit, a processing unit and a display unit, the receiving unit being configured to receive a digital signature from the potential extension unit and to forward the digital signature to the processing unit, the processing unit being configured to process the digital signature in order to predict whether the existing test and measurement setup is compatible with the potential extension unit, the processing unit being further configured to forward the result of the prediction to the display unit so that the result of the prediction is displayed.

Moreover, embodiments of the present disclosure provide a method for predicting compatibility of an existing test and measurement setup with a potential extension unit based on digital signatures, with the following steps:

Receiving a digital signature from the potential extension unit,

Processing the digital signature of the potential extension unit to retrieve information with regard to the potential extension unit, and Predicting the compatibility of the existing test and measurement setup with the potential extension unit by taking information of the existing test and measurement setup and the information of the potential extension unit into account Accordingly, the compatibility of a certain functional unit, also called instrument, being used additionally or instead of an already existing functional unit with the test and measurement setup can be verified in a digital manner prior to the purchase of the respective physical functional unit. Moreover, it is no more necessary that the user or rather operator of the test and measurement setup has to study the data sheets and/or brochures of the respective units, in particular the one of the potential extension unit as the respective information is directly forwarded to the prediction system, in particular the respective processing unit processing the information received, namely the digital signature received.

The extension unit may also relate to a software license for an existing functional unit of the test and measurement setup such as a software upgrade or rather a software extension. Thus, it can be verified in a digital manner whether the respective software license can be used with the present test and measurement setup, in particular the physical functional units present.

The digital signatures used for the prediction of the compatibility may be obtained directly. This means that the digital signatures may be exchanged directly as the respective extension unit may push its digital signature which is received by the receiving unit of the prediction system.

Hence, the digital signature may be a pushed digital signature. Thus, the digital signature is automatically forwarded to the receiving unit without requesting the digital signature from the potential extension unit.

The digital signature of the respective extension unit may also be gathered indirectly, for instance by a picture of the extension unit. Thus, a camera may record a picture of the potential extension unit or rather its packaging wherein an optical recognition unit configured to identify the potential extension unit based on the respective data generates the digital signature that is forwarded to the receiving unit. Furthermore, the potential extension unit may have a code to be scanned, for instance a barcode, a QR code or any other suitable code. The code is decoded to obtain the digital signature of the respective potential extension unit wherein the digital signature obtained is forwarded to the receiving unit.

Thus, the digital signature may be obtained directly (pushed digital signature) or indirectly from the potential extension unit.

Generally, each functional unit, namely the ones of the existing test and measurement setup as well as the potential extension unit, may have a certain digital signature so that at least different series can be distinguished from each other due to the digital signature(s).

The respective digital signature may provide information regarding the extension unit, for instance instrument details, and/or the expected service life or rather the expected shelf life of the functional unit.

According to an aspect, the prediction system comprises a memory in which information regarding the existing test and measurement setup is stored, the processing unit accessing the memory for obtaining the information used for predicting the compatibility. The information stored may correspond to the digital signature(s) of the unit(s) of the existing test and measurement setup. Thus, the processing unit can use the respective data, information or rather digital signature(s) for predicting purposes. Hence, the digital signature relates to certain (viable) data and/or information used for predicting the compatibility.

In fact, the processing unit verifies whether the digital signature(s) of the existing test and measurement setup and the digital signature of the potential extension unit match.

On the processing unit, at least one algorithm may run that is used for predicting the compatibility wherein the digital signature(s) are used as input parameters.

According to another aspect, the receiving unit comprises a wireless communication interface configured to receive a signal sent by the potential extension unit. The signal received may comprise the digital signature of the potential extension unit so that the digital signature is obtained directly. The wireless communication interface may be an unidirectional one so that it can only receive data, for instance the digital signature or a signal related thereto. As already mentioned, the digital signature may correspond to pushed information or rather pushed data.

For instance, at least the display unit is part of an augmented reality device. Therefore, at least the result of the prediction may be displayed as part of an augmented reality provided by the augmented reality device. Hence, the display unit may display the environment as well as the result of the prediction or the display unit may superpose the result of the prediction. For instance, the augmented reality device is established by augmented reality glasses comprising a display unit for superposing at least the result of the prediction. In addition, information related to the digital signature obtained may be displayed via the display unit.

According to an embodiment, the prediction system has a prediction device comprising at least one of the receiving unit, the processing unit, and the display unit. The prediction device may communicate with certain units of the prediction system such that data or rather information is exchanged, for instance in a pushed manner, among the several units of the prediction system.

The prediction device may also comprise a memory in which information regarding the existing test and measurement setup is stored. Accordingly, the whole prediction system may be established by a prediction device having a housing encompassing the components of the prediction system.

For instance, the prediction device solely comprises the display unit so that data to be displayed is pushed onto the prediction device (pushed information). This data may relate to the result of the prediction, information assigned to the digital signature or further information related to the existing test and measurement setup and/or the potential extension unit.

Moreover, the prediction device may also comprise the receiving unit, the processing unit and the display unit. Thus, the prediction device receives a signal or rather the digital signature of the potential extension unit via the respective receiving unit as pushed information. Further, the computational power for processing the respective information, namely the digital signature(s), is also encompassed within the prediction device.

Generally, such a prediction device can be established by augmented glasses, a mobile phone or rather a tablet as these devices comprise a (wireless) communication interface as well as a display unit. As mentioned earlier, the information or rather data to be displayed may be forwarded to the respective display unit, namely the prediction device, in a pushed manner.

The (wireless) communication interface of the prediction device may be used as the receiving unit for receiving the pushed digital signature.

The prediction device may be configured to receive test results of the existing test and measurement setup being pushed to the prediction device. Test results of the existing test and measurement setup may be pushed to the prediction device.

The test results obtained can be used for further analyses. For instance, the prediction device may be configured to analyze the test results at least partly and/or to forward the test results of the existing test and measurement setup to another unit or rather device for analyzing purposes.

The test results may be pushed to the prediction device. The test results may be forwarded to the prediction device automatically without requesting the test results.

For instance, the prediction device is configured to forward at least one of the test results of the existing test and measurement setup and an analysis of the test results to the potential extension unit.

At least one of the test results of the existing test and measurement setup and an analysis of the test results may be forwarded to the potential extension unit via the prediction device.

Thus, the prediction device can be used to test the implementation of the potential extension unit within the existing test and measurement setup without the need of physically implementing the potential extension unit as the prediction device forwards data to the potential extension unit for further analyzing.

The test results or rather the data related to the analysis may be pushed to the potential extension unit. The test results or rather the data related to the analysis may be forwarded to the potential extension unit automatically without any previous request.

Another aspect provides that the display unit is configured to display at least a symbol and/or a representation of the potential extension unit. Thus, the user gets a feeling or rather visual impression on how the potential extension unit would look like.

The display unit may be configured to display at least a symbol and/or a representation of the existing test and measurement setup extended by the potential extension unit.

At least one of the potential extension unit and the existing test and measurement setup extended by the potential extension unit may be displayed via a display unit.

Hence, the user gets a feeling or rather visual impression on how the implementation of the potential extension unit within the existing test and measurement setup would look like.

Particularly, the prediction system is configured to simulate the existing test and measurement setup extended by the potential extension unit.

The characteristics of the existing test and measurement setup extended by the potential extension unit may be simulated.

Thus, the characteristics of the extended test and measurement setup can be simulated and analyzed appropriately. Accordingly, the user gets information about the interaction or rather the performance of the extended test and measurement setup, namely the existing test and measurement setup extended by the potential extension unit. This corresponds to a product try on as the implementation, in particular its performance, is simulated.

According to an aspect, at least one of the digital signature, the digital signature processed and the result of the prediction is pushed to a prediction device for further processing. As already mentioned, the prediction device may comprise several components of the prediction system. Depending on the components provided by the prediction device, different data is exchanged between the components, in particular in a pushed manner.

Generally, the prediction system may comprise several prediction devices communicating with each other.

For instance, a first prediction device comprises the receiving unit and the processing unit so that the pushed digital signature of the potential extension unit is received and processed (and optionally processed such that the result of the prediction is obtained). This data, namely the digital signature(s) processed or rather the result of the prediction, is then forwarded to a second prediction device (in a pushed manner).

The second prediction device may comprise the display unit so that the result of the prediction is displayed. Alternatively, the second prediction device may additionally comprise a processing unit for predicting whether the existing test and measurement setup is compatible with the potential extension unit.

The information of the existing test and measurement setup is obtained from digital signatures of units of the existing test and measurement setup. Hence, the units may have provided their digital signatures previously. For instance, the information related to the digital signatures was extracted and stored so that the information can be accessed easily.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
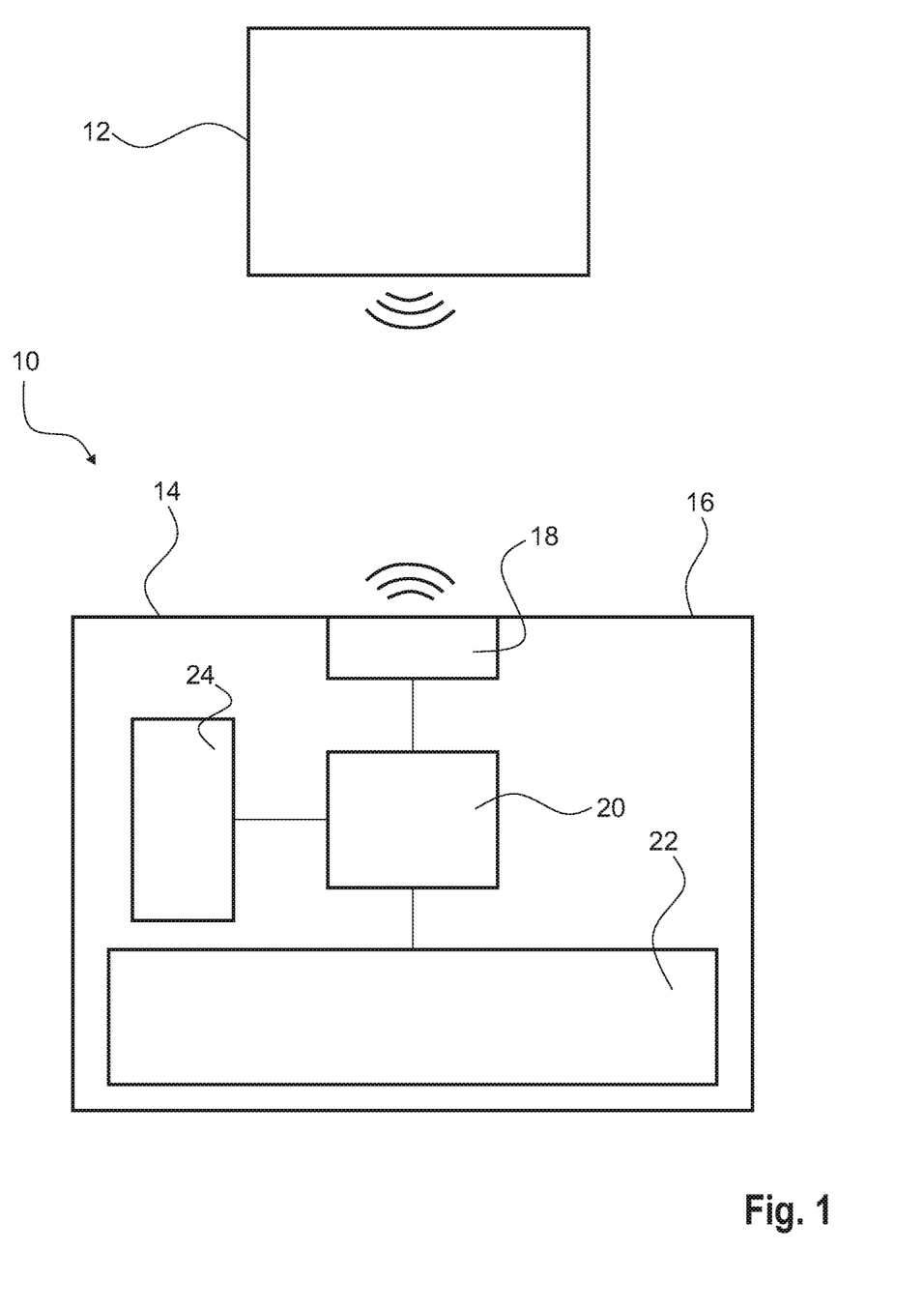
FIG. 1 schematically shows a prediction system according to an embodiment of the present disclosure.

In FIG. 1, a prediction system 10 for predicting compatibility of an existing test and measurement setup with a potential extension unit 12 is shown which may be established by a physical functional unit such as an instrument or a software license.

In the shown embodiment, the prediction system 10 comprises a prediction device 14 having a housing 16 that encompasses several components, namely a receiving unit 18 for receiving information, a processing unit 20 that is connected to the receiving unit 18 so that the information received by the receiving unit 18 is forwarded to the processing unit 20 for processing purposes as will be described later. The receiving unit 18 is established by a wireless communication interface so that the information is received wirelessly.

Moreover, the prediction device 14 comprises a display unit 22 that is connected to the processing unit 20 so that the processing unit 20 is enabled to control the display unit 22 appropriately. Thus, the information displayed on the display unit 22 is at least partly controlled by the processing unit 20.

In addition to these components, the prediction device 14 comprises a memory 24 that is also connected to the processing unit 20 so that the processing unit 20 may access the memory 24. In the memory 24, information regarding the existing test and measurement setup to be extended by the extension unit 12, in particular the respective units and/or components of the existing test and measurement setup, is stored so that the processing unit 20 may retrieve the respective information by accessing the memory 24 for predicting the compatibility of the existing test and measurement setup and the potential extension unit 12.

Figure 3:
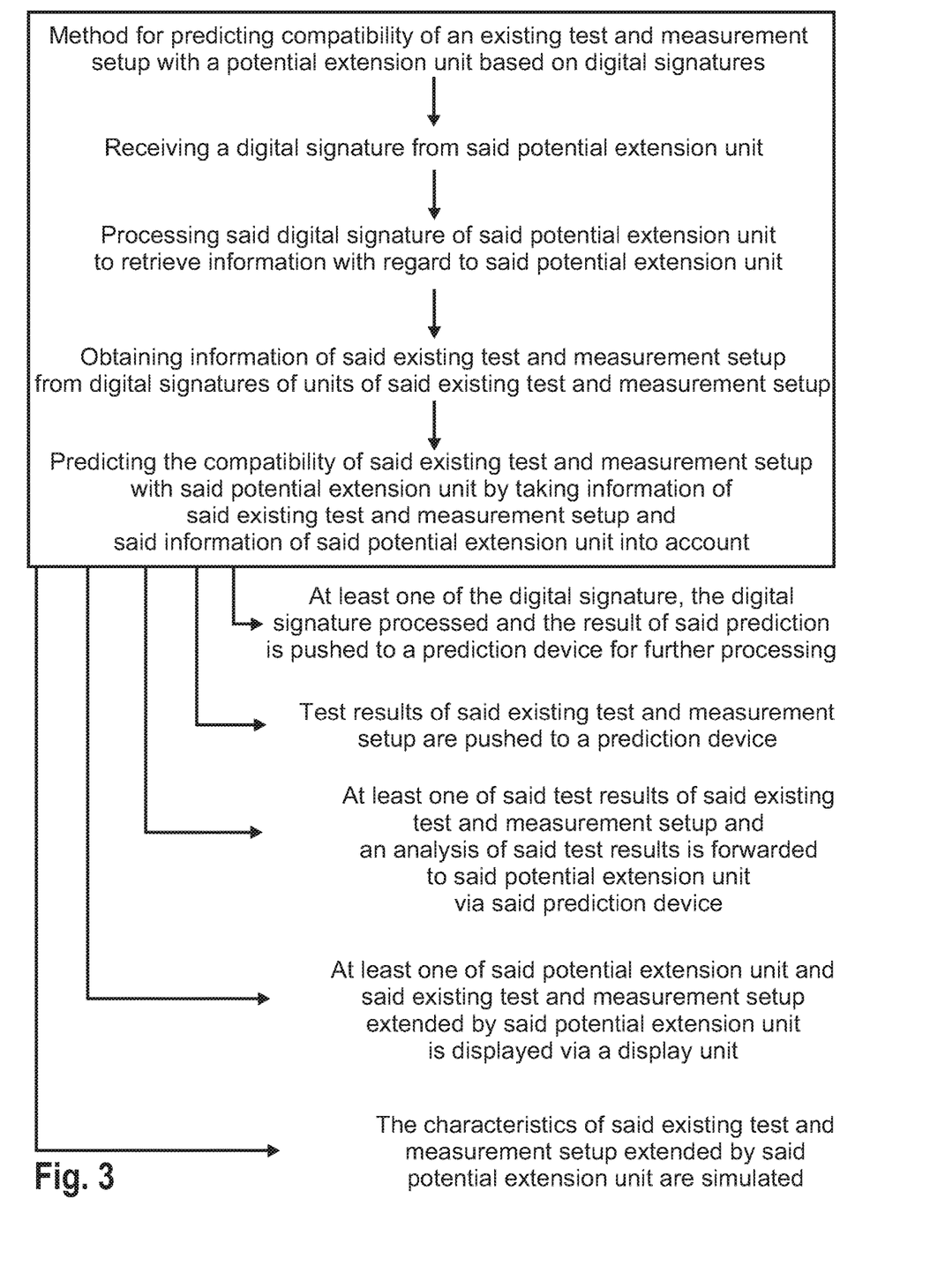
FIG. 3 schematically shows a flowchart representing a method for predicting compatibility of an existing test and measurement setup with a potential extension unit according to an embodiment of the present disclosure.

The predicting will be described hereinafter while also taking FIG. 3 into account that illustrates a flowchart representing a method for predicting compatibility of the existing test and measurement setup with the potential extension unit 12 based on digital signatures.

In general, the receiving unit 18 receives the digital signature from the potential extension unit 12, for instance directly. The extension unit 12 may emit a signal containing the respective digital signature wherein the signal is received by the receiving unit 18.

The respective signal, in particular the digital signature, is forwarded to the processing unit 20 for evaluating purposes.

The processing unit 20 receives the respective signal from the receiving unit 18 so that the digital signature may be decoded from the signal.

Moreover, the processing unit 20 may access the memory 24 in which information regarding the existing test and measurement setup is stored so that the processing unit 20 is enabled to perform a prediction regarding the compatibility of the potential extension unit 12 with regard to the existing test and measurement setup.

The information stored in the memory 24 may correspond to digital signature(s) of the existing test and measurement setup recorded previously.

In other words, the information with regard to the existing test and measurement setup was obtained from digital signatures of the (functional) units of the existing test and measurement setup.

As mentioned above, the processing unit 20 is enabled to perform the prediction regarding the compatibility so that a result of the prediction is obtained.

The result of the prediction is forwarded to the display unit 22 so that the result of the prediction can be displayed to the operator of the prediction system 10.

Accordingly, the prediction device 14 can display at least the result of the prediction.

Despite the result of the prediction, further information, for instance the expected lifetime of the (extended) system and/or the expected lifetime of the potential extension unit 12, or any other relevant information can be calculated and displayed appropriately. Thus, the customer obtains all relevant information prior to the purchase of the potential extension unit 12.

The potential extension unit 12 and/or the existing test and measurement setup extended by the extension unit 12 can be displayed on the display unit 20 of the prediction device 14 so that the customer is enabled to obtain an impression with regard to the potential extension unit 12 or rather the extended test and measurement setup, namely the existing test and measurement setup extended by the potential extension unit 12.

Moreover, the prediction device 14, in particular the processing unit 20, is configured to simulate the existing test and measurement setup extended by the potential extension unit 12. Due to the simulation, the characteristics of the extended test and measurement setup can be evaluated appropriately.

Hence, the customer or operator can achieve information regarding the potential extended test and measurement setup before the potential extension unit 12 is physically implemented in the existing test and measurement setup, in particular prior to buying the respective extension unit 12, namely the instrument and/or the software license. Thus, the user or rather customer is enabled to retrieve information whether the potential extension unit 12 matches his expectation or not.

In general, the prediction device 14 may be an augmented reality unit, for instance augmented reality glasses, a mobile phone, a tablet or any other suitable user end device. Accordingly, the environment may also be displayed wherein the respective information is superposed, for instance the result of the prediction and the other information retrieved.

Moreover, the respective prediction device 14 may be configured to receive test results of the existing test and measurement setup, in particular wherein the test results are pushed to the prediction device 14 automatically without any request. The prediction device 14 may analyze the test results or temporarily store the test results.

For instance, the prediction device 14 is also configured to forward the test results received and/or the analyses done to the potential extension unit 12 so that a real check with regard to the compatibility of the potential extension unit 12 can be done prior to its purchase. In fact, it can be verified whether the extended test and measurement setup fulfills the expectations of the customer.

In general, the respective information regarding the potential extension unit 12, namely the signal containing the digital signature, may be pushed to the prediction device 14.

This can be done by guessing that the customer is interested in the information as the customer stands in front of the respective extension unit 12 for a certain time (being stationary) so that the prediction device 14 receives the respective digital signature of the potential extension unit 12 in an automatic manner (pushed information).

Thus, the respective information required with regard to the compatibility and further relevant system information such as expected system life can be retrieved in an easy manner without engaging sales people prior to the purchase of a respective potential extension unit 12.

In general, the customer gets certainty in an effective manner how the potential extension unit 12 (new instrument and/or new software license) fits into the existing test and measurement setup.

Figure 2:
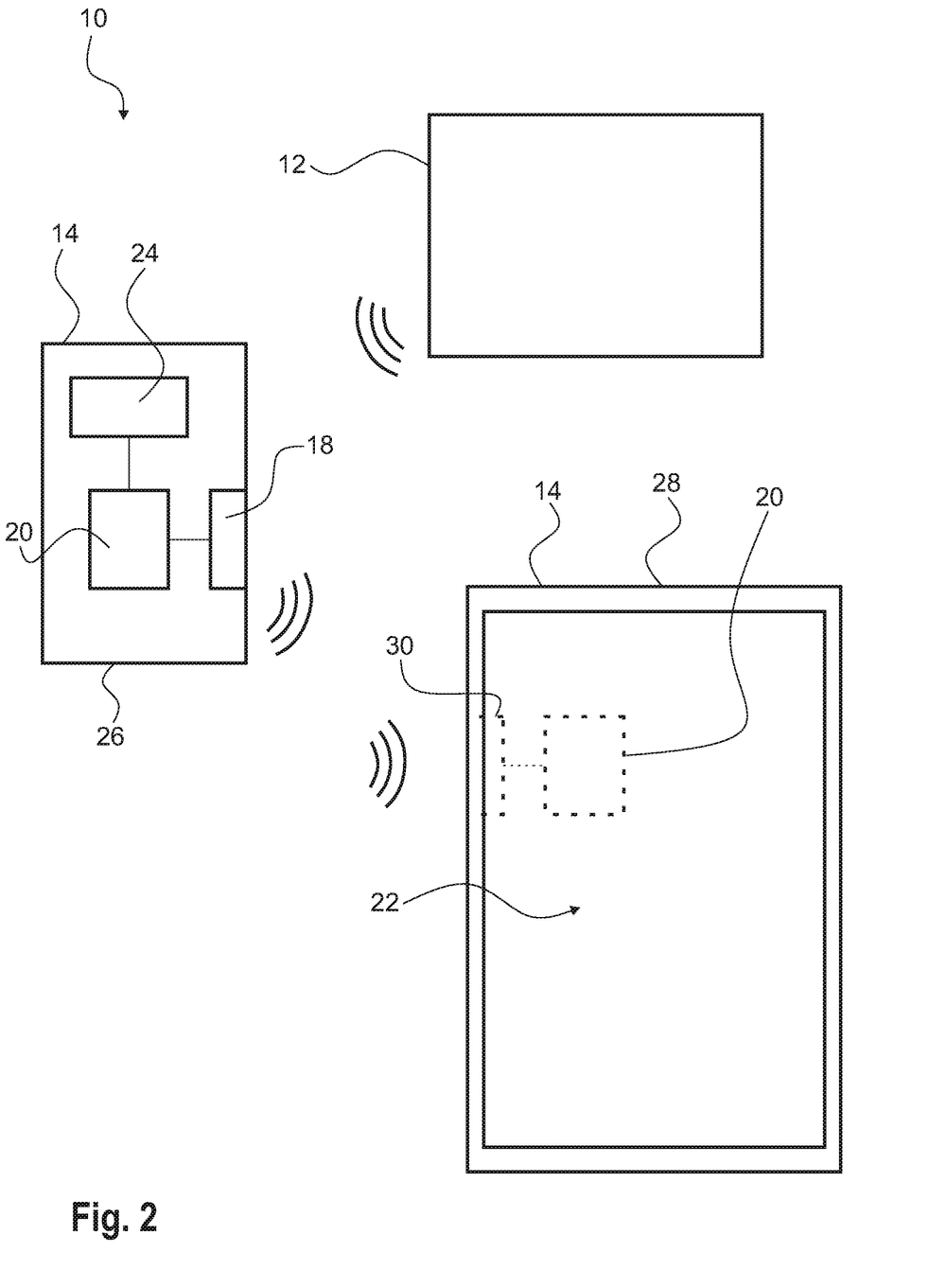
FIG. 2 schematically shows a prediction system according to an embodiment of the present disclosure.

In FIG. 2, another embodiment of the prediction system 10 is shown that comprises two prediction devices 14, wherein the first prediction device 14 relates to a base station 26 and the second prediction device 14 relates to a mobile end device 28, for instance a mobile phone as shown or augmented reality glasses.

The base station 26 receives the pushed information, namely the digital signature, from the potential extension unit 12 as described previously.

Then, the information received is forwarded to the processing unit 20 of the base station 26 wherein the processing unit 20 accesses the memory 24 for retrieving information regarding the existing test and measurement setup.

The processing unit 20 performs the prediction of the compatibility wherein the result of this prediction is pushed forward to the second prediction device 14, namely the mobile end device 28, that comprises the display unit 22.

The pushed information, namely the result of the prediction, is received by the second prediction device 14 or rather the mobile end device 28 via a (wireless) communication interface 30. The communication interface 30 is connected with a processing unit 20 that controls the display unit 22 appropriately.

Thus, the processing unit 20 of the embodiment shown in FIG. 1 is split into two processing units 20 provided by both prediction devices 14.

The receiving unit 18 of the first prediction device 14 may be established by a bidirectional communication interface as it is used for receiving the digital signature of the potential extension unit 12 and for transmitting the result of the prediction.

In the shown embodiments, the data or rather information is exchanged directly and automatically so that the data or rather information is pushed.

In fact, the digital signature and/or the result of the prediction may be pushed to the respective prediction device 14.

As mentioned previously, the prediction device 14 may be augmented reality glasses comprising the receiving unit 18, namely a (wireless) communication interface, configured to receive pushed digital signature(s), the processing unit 20, the display unit 22 as well as the memory 24.

Thus, the potential extension unit 12 pushes the information, namely its digital signature, to the augmented reality glasses so that the digital signature can be processed as described previously.

Accordingly, the augmented reality glasses process the digital signature of the potential extension unit 12 as well as the information, namely the digital signature(s), of the existing test and measurement setup so that a prediction with regard to the compatibility is done by the augmented reality glasses.

The result of this prediction is displayed to the customer via the display unit 22 established by the lenses of the augmented reality glasses.

In addition to the result of the prediction, further information such as expected system life can be displayed generally, in particular via the display unit 22 of the augmented reality glasses.

Generally, a representative and/or a symbol assigned to the potential extension unit 12 may be displayed, in particular via the display unit 22 of the augmented reality glasses.

Moreover, a symbol and/or a representation assigned to the extended test and measurement setup may be displayed, in particular via the display unit 22 of the augmented reality glasses.

In addition, the prediction system 10, in particular the processing unit 20, is configured to simulate the existing test and measurement setup extended by the potential extension unit 12 so that the characteristics of the extended test and measurement setup can be verified by the simulation. Moreover, the results of the simulation are displayed via the display unit 22, for instance the display unit 22 of the augmented reality glasses.

Alternatively or additionally, test results of the existing test and measurement setup are pushed to the prediction device 14, for instance the augmented reality glasses, wherein the prediction device 14 may analyze the test results or forward the test results and/or the analyses already performed to the potential extension unit 12 for (further) analyzing purposes.

Accordingly, the performance of the potential extension unit 12 within the existing test and measurement setup can be tested prior to the physical implementation of the potential extension unit 12.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A prediction system, wherein the prediction system is capable of predicting compatibility of an existing test and measurement setup with a potential extension unit based on digital signatures, wherein the test and measurement setup comprises several functional units coupled with a common unit of the test and measurement setup so that certain components may be shared among the several functional units, wherein the several functional units and the potential extension unit are used for performing tests and measurements, and wherein the prediction system comprising a receiving circuit, a processing circuit, a display unit, and a memory,
the potential extension unit relating to a software license for an existing functional unit of the test and measurement setup, wherein the software license is associated with a software upgrade or a software extension,
the memory having stored thereon information regarding the current test and measurement setup,
the receiving circuit being configured to receive a digital signature of the software license and to forward the digital signature to the processing circuit,
the processing circuit being configured to process the digital signature to predict whether the existing test and measurement setup is compatible with the software license prior to a purchase of the software license,
the processing circuit being configured to access the memory to obtain the information used for predicting the compatibility, and
the processing circuit being configured to forward the result of the prediction to the display unit so that the result of the prediction is displayed.

2. The prediction system according to claim 1, wherein the information stored in the memory corresponds to digital signatures of the existing test and measurement setup to distinguish different series from each other.

3. The prediction system according to claim 1, wherein a packaging of the potential extension unit has a code to be scanned, wherein the code is decoded to obtain the digital signature of the software license.

4. The prediction system according to claim 1, wherein at least the display unit is part of an augmented reality device.

5. The prediction system according to claim 1, wherein the prediction system has a prediction device comprising at least one of the receiving circuit, the processing circuit, or the display unit.

6. The prediction system according to claim 5, wherein the prediction device is configured to receive test results of the existing test and measurement setup being pushed to the prediction device.

7. The prediction system according to claim 6, wherein the prediction device is configured to forward at least one of the test results of the existing test and measurement setup and an analysis of the test results to the potential extension unit.

8. The prediction system according to claim 1, wherein the display unit is configured to display at least a symbol and/or a representation of the potential extension unit.

9. The prediction system according to claim 1, wherein the display unit is configured to display at least a symbol and/or a representation of the existing test and measurement setup extended by the potential extension unit.

10. The prediction system according to claim 1, wherein the prediction system is configured to simulate the existing test and measurement setup extended by the potential extension unit.

11. A method for predicting compatibility, wherein the method is capable of predicting compatibility of an existing test and measurement setup with a potential extension unit based on digital signatures, wherein the test and measurement setup comprises several functional units coupled with a common unit of the test and measurement setup so that certain components may be shared among the several functional units, wherein the several functional units and the potential extension unit are used for performing tests and measurements, the method comprising:
receiving via a receiving circuit a digital signature from the potential extension unit, the potential extension unit including an instrument for the existing test and measurement setup or a software license for an existing functional unit of the test and measurement setup;
processing via a processing circuit the digital signature of the potential extension unit to retrieve information with regard to the potential extension unit, wherein the digital signature provides information regarding the expected service life or the expected shelf life of the potential extension unit;
accessing via the processing circuit a memory storing information regarding the existing test and measurement setup to obtain information, wherein the information stored corresponds to digital signatures of the existing test and measurement setup;
predicting via the processing circuit the compatibility of the existing test and measurement setup with the potential extension unit prior to a purchase of the potential extension unit by taking information of the existing test and measurement setup and the information of the potential extension unit into account;
simulating the existing test and measurement setup extended by the potential extension unit, thereby simulating characteristics of the existing test and measurement setup extended by the potential extension unit so that the characteristics of the extended test and measurement setup can be verified by the simulation in order for an operator to receive information regarding the potential extended test and measurement setup before the potential extension unit is implemented in the existing test and measurement setup, and displaying the result of the prediction as well as the results of the simulation as part of an augmented reality provided by an augmented reality device such that a display unit of the augmented reality device displays an environment as well as the result of the prediction and the results of the simulation or the display unit superposes the result of the prediction and the results of the simulation.

12. The method according to claim 11, wherein at least one of the digital signature, the digital signature processed, and the result of the prediction is pushed to a prediction device for further processing.

13. The method according to claim 12, wherein test results of the existing test and measurement setup are pushed to the prediction device.

14. The method according to claim 13, wherein at least one of the test results of the existing test and measurement setup and an analysis of the test results is forwarded to the potential extension unit via the prediction device.

15. The method according to claim 11, wherein at least one of the potential extension unit and the existing test and measurement setup extended by the potential extension unit is displayed via a display unit.

16. The method according to claim 11, wherein the characteristics of the existing test and measurement setup extended by the potential extension unit are simulated.

17. The method according to claim 11, wherein the information of the existing test and measurement setup is obtained from digital signatures of units of the existing test and measurement setup.

18. A prediction system, wherein the prediction system is capable of predicting compatibility of an existing test and measurement setup with a potential extension unit based on digital signatures, wherein the test and measurement setup comprises several functional units coupled with a common unit of the test and measurement setup so that certain components may be shared among the several functional units, wherein the several functional units and the potential extension unit are used for performing tests and measurements, and wherein the prediction system comprising a receiving circuit, a processing circuit, a camera, a memory, and a display unit, wherein the potential extension unit is an instrument, the camera being configured to record a picture of the instrument or the packaging of the instrument, wherein an optical recognition circuit is configured to identify the instrument based on the respective data and to generate a digital signature of the instrument for the existing test and measurement setup, or the camera being configured to scan a code on the instrument or the packaging of the instrument, wherein the code is decoded to obtain a digital signature of the instrument for the existing test and measurement setup, the receiving circuit being configured to receive the digital signature and to forward the digital signature to the processing circuit, the processing circuit being configured to access the memory storing information regarding the existing test and measurement setup and to process the digital signature to predict whether the existing test and measurement setup is compatible with the instrument prior to a purchase of the instrument by verifying whether the digital signatures of the instrument and the existing test and measurement setup match, the processing circuit being configured to simulate the existing test and measurement setup extended by the instrument, thereby simulating characteristics of the existing test and measurement setup extended by the instrument so that the characteristics of the extended test and measurement setup can be verified by the simulation in order for an operator to receive information regarding the potential extended test and measurement setup before the instrument is physically implemented in the existing test and measurement setup, the processing circuit being further configured to forward the result of the prediction and the results of the simulation to the display unit so that the result of the prediction and the results of the simulation are displayed via the display unit.

19. The prediction system according to claim 18, wherein the display unit is part of an augmented reality device, and wherein the result of the prediction and the results of the simulation are displayed as part of an augmented reality provided by the augmented reality device.

* * * * *